United States Patent [19]
Hodges

[11] Patent Number: 5,123,627
[45] Date of Patent: Jun. 23, 1992

[54] CONDENSATE DRAIN FITTING WITH CHECK VALVE AND STEPPED DIAMETERS TO FIT DIFFERENT PIPE SIZES

[76] Inventor: B. Eugene Hodges, 761 Palmer Dr., Greenville, Mich. 48838

[21] Appl. No.: 672,488

[22] Filed: Mar. 20, 1991

[51] Int. Cl.⁵ .......................... F16L 5/00; F16L 41/08
[52] U.S. Cl. ...................................... 251/146; 137/798; 210/117; 251/148; 285/156; 285/176; 285/197; 285/382
[58] Field of Search ............... 210/117; 137/215, 312, 137/798; 251/148, 151, 152, 145, 146; 285/150, 156, 176, 177, 382, 910, 923, 132, 189, 238, 239, 197

[56] References Cited

U.S. PATENT DOCUMENTS

| | | | |
|---|---|---|---|
| 2,688,499 | 9/1954 | Hanson | 285/176 |
| 2,898,128 | 8/1959 | Shohan | 285/156 |
| 3,119,887 | 1/1964 | Baehr | 137/312 |
| 3,648,729 | 3/1972 | Balkany | 137/798 |
| 4,966,397 | 10/1990 | McKinnon | 285/197 |
| 5,020,832 | 6/1991 | Coblentz | 285/197 |

Primary Examiner—Robert A. Dawson
Assistant Examiner—Joseph Drodge

[57] ABSTRACT

A drain fitting adapted to receive and direct condensate into a drain pipe comprises a cylindrical body with multiple stepped diameters for attaching condensate drain hoses of different sizes, and includes an internal one-way ball check valve to prevent material from reversing flow and escaping out of the drain pipe. The body attaches to the drain pipe by either a clamped-on connector consisting of multiple parallel hinged elements molded integral with both the fitting body and with each other, or by being glued into a screwed-in fitting received in the threaded opening of a Y-branch fitting in the drain pipe. The ball is retained in the check valve opening by ridges formed by pressing a hot tool to crimp over the edges of the fitting opening.

7 Claims, 2 Drawing Sheets

U.S. Patent    June 23, 1992    Sheet 1 of 2    5,123,627

CONDENSATE DRAIN FITTING WITH CHECK VALVE AND STEPPED DIAMETERS TO FIT DIFFERENT PIPE SIZES

BACKGROUND OF THE INVENTION

A common plumbing problem is how to direct liquid condensate issuing from dehumidifiers, air conditioning chillers (evaporator) and high efficiency furnaces into a drain line for disposal. The condensate issues in small amounts, either continuously or intermittently, and consists essentially of moisture from air which has been cooled below its saturation temperature, causing it to condense, along with whatever dust, spores, or other contaminants which may have been removed from the air along with the moisture.

Typically, the condensate stream is of small volume but can issue in a steady flow, particularly during warm, humid weather. Some appliances, such as household refrigerators, simply direct the condensate flow into accumulation trays where it is allowed to evaporate, but this is not sufficient in cases where the volume is too great, or where the objective is to entirely remove the moisture from the air and not let it evaporate back again.

In any installation where waste liquids, including but not limited to condensate, are introduced into drain lines connected to a sanitary sewer system, care must be taken to prevent waste from backing up the drain line from the sewer. If the drain line serves an air conditioning system, for example, the influx of sewage or sewage odors could make an entire living quarters uninhabitable.

Where a new condensate drain is to be installed in an existing plumbing installation, an additional problem is presented. The drain line into which the condensate is to be directed may or may not have a suitable opening to receive it. By installing a branching adapter, such as a clean-out fitting, an opening may be provided, but it is typically two or three inches in diameter and receives a threaded closure fitting. This opening is much larger than the usual drain line, which may be simply a length of ¼ or ⅜ inch internal diameter plastic tubing. To merely run the drain line tubing into an open cleanout fitting not only creates the likelihood of noxious sewer gases from issuing into the space, but may violate local plumbing codes as well.

SUMMARY OF THE INVENTION

It is an objective of the present invention to provide a simple, inexpensive, condensate drain fitting which a workman can install quickly and without the use of special tools. A related objective is to achieve a connection between a condensate drain line and a drain pipe or clean-out fitting which permits the free flow of liquid condensate into the line, but is secure against back flow of liquids or gases from the drain pipe or sewer.

A further object is to provide a condensate drain fitting which easily mates with drain lines of varying sizes, and permits them to be attached simply by being pushed into place and secured with a hose clamp.

Yet another object is to provide such a fitting which can be quickly and easily attached to a solid drain pipe without the necessity of breaking the line and interposing a clean-out fitting or other structure to provide the required drain opening. More particularly, an object of the invention is to provide such a fitting which installs easily over a drilled hole in the drain line, and is sealed against it with the use of simple hose clamps or similar retaining devices.

A further object is to provide such a self-sealing fitting which is also self-adapting to drain lines of varying sizes, and can be bent to the proper radius of curvature to seal securely against leakage.

THE DRAWINGS

DETAILED DESCRIPTION OF THE INVENTION

Figure 1:
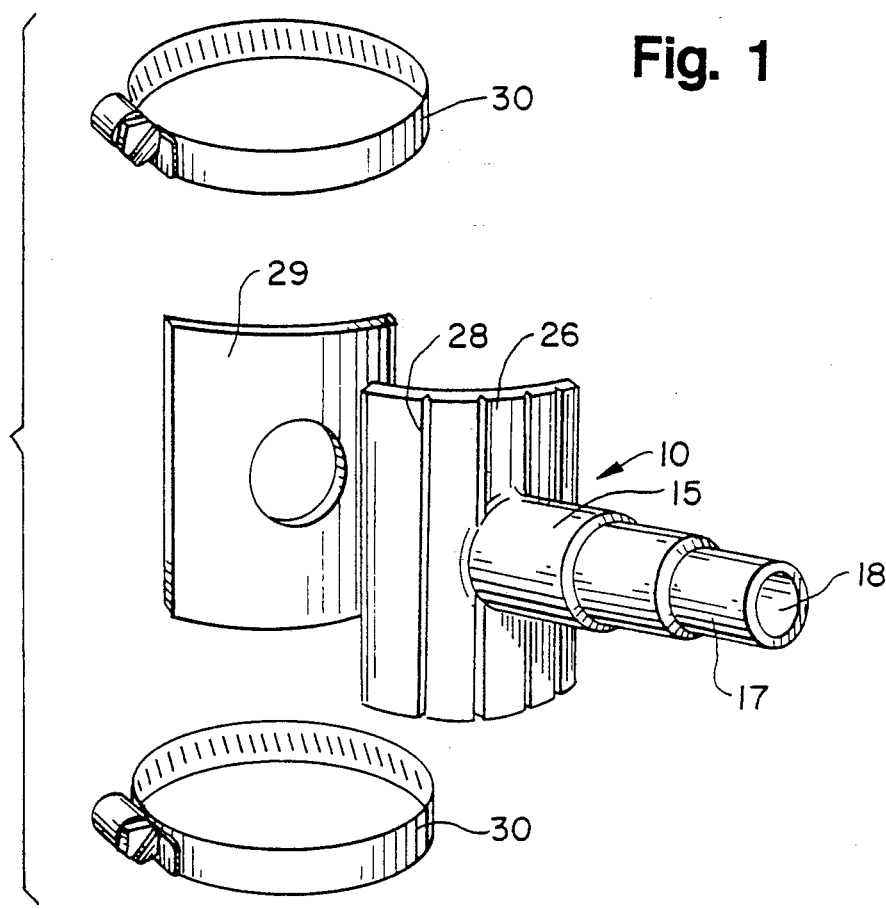
FIG. 1 is a perspective view of the condensate fitting of the present invention, shown in exploded view with its attachment clamps and gasket, ready to attach to a section of drain pipe.
Figure 2:
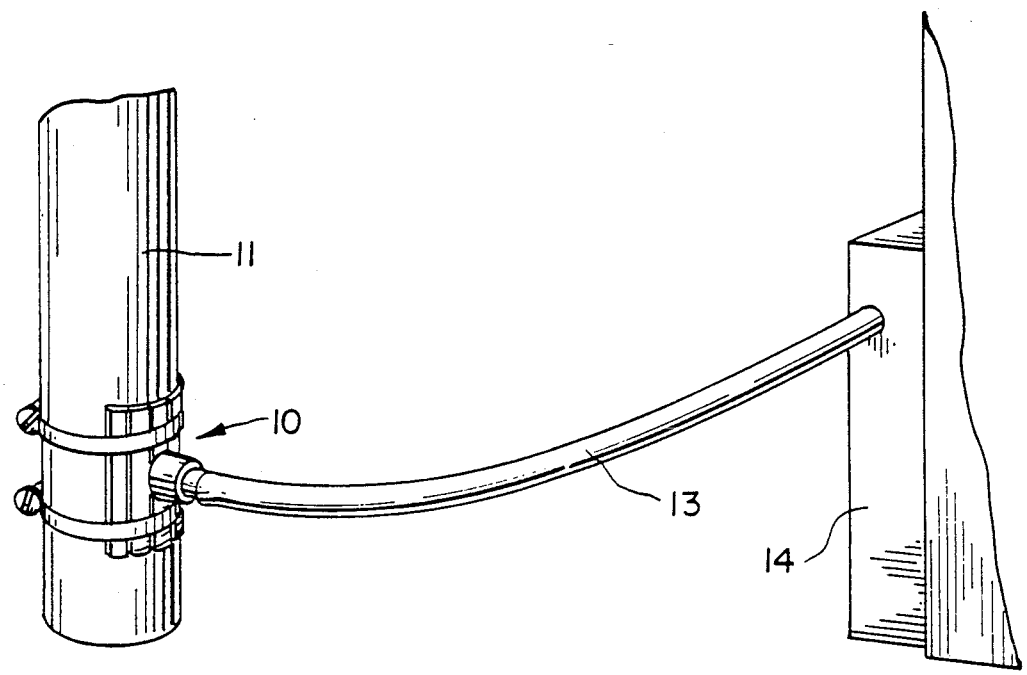
FIG. 2 is a perspective of the condensate fitting of FIG. 1 as installed.
Figure 3:
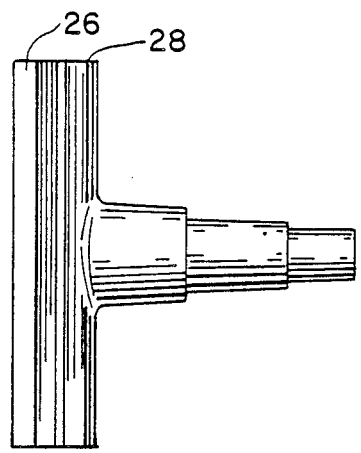
FIG. 3 is a side elevation of the fitting.
Figure 4:
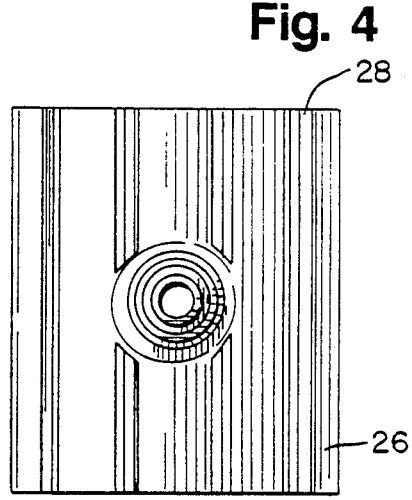
FIG. 4 is a front elevation of the fitting.
Figure 5:
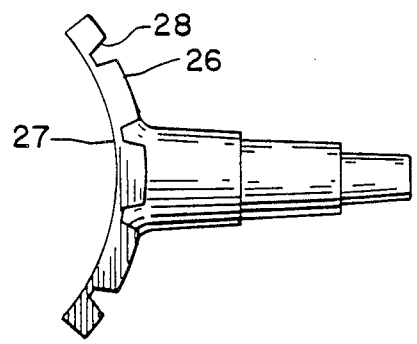
FIG. 5 is a plan view of the fitting.

Turning to the drawings, there is shown in FIG. 1 the preferred embodiment of the drain fitting of the present invention. The fitting 10 is attached to a drain pipe 11 having an opening 12 through which the flow of condensate will be directed. A drain line 13 attaches to the fitting 10 and runs to a source of condensate 14, such as a dehumidifier or air conditioning chiller.

Figure 6:
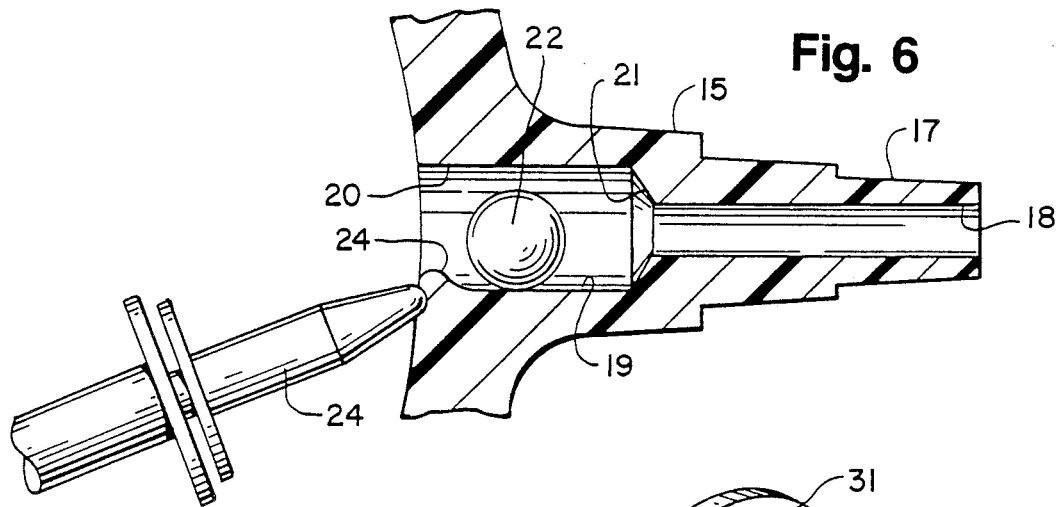
FIG. 6 is a cross-section of the fitting showing its internal check valve.

The fitting 10 consists of a cylindrical body 15 having a series of progressively smaller stepped-down diameters 17, tapering toward its outwardly-extending tip. At the tip there is an inlet opening 18 leading to a check valve chamber 19 (FIG. 6) and terminating at an outlet opening 20. As provided by the invention, drain lines of widely varying internal diameter may be accommodated by simply slipping the drain line 13 over the stepped diameters of the fitting until it encounters the diameter which is correct, whereupon it will abut against the next larger diameter and be positively located. If the diameter is sized slightly larger than the drain line 13, and if the drain line is somewhat elastic (such as with polyethylene or other common tubing materials) then the drain line 13 will be secured by its own elastic tension to the fitting. Alternatively, a hose clamp may be used to secure the drain line to the corresponding stepped diameter in sealing relationship.

The check valve chamber includes a valve seat 21 and a valve element 22, which is in this embodiment a ball, but can be of any suitable shape to seat in sealing relationship to the seat 21. The element 22 is free to move axially along the passage leading to the outlet opening 20 so as to cover and uncover the seat 21 according to the flow of fluid in the passage, thereby functioning as a one-way valve to permit the flow of condensate toward the outlet opening 20, but not in the opposite direction.

The valve element 22 is captured within the check valve chamber 19 by retaining means, which in the illustrated embodiment are retaining ridges formed from the substance of the fitting itself by a tool under heat and pressure. Preferably, the fitting 10 is made of thermoplastic such as polyethylene which may be injection-molded to the desired shape. In the as molded condition, the outlet opening 20 is sized to permit the free insertion of the valve element 22, after which retaining ridges 24 are formed which partially close the outlet opening and prevent the valve element 22 from escaping the check valve chamber 19.

The retaining ridges 23 are preferably formed by first inserting the valve element 22, and then applying a heated tool 24 to at least two locations approximately equally spaced about the periphery of the outlet opening 20, thereby heating and softening the plastic at each such location and causing it to spread inward to form a retaining ridge 23 which prevents the valve element 20 from escaping.

A principal feature of the invention is the provision of a flexible mounting base 26 for the fitting 10, which enables it to be fitted to drain pipes of widely varying external diameter. In fact, the fitting of the invention has proven able to accommodate drain pipe outside diameters from one and one-half inches to four inches. The fitting 10 can even be attached to a flat surface so long as it may be secured attached to the surface.

This is achieved in the preferred embodiment of FIGS. 1 - 6 by providing the fitting 10 with a flexible base 26 comprising a curved planar surface 27 containing a plurality of parallel grooves 28 in the surface which faces outward from the drain pipe 11 when the fitting is secured in place. These outwardly-facing grooves 28 act as multiple hinges, providing enhanced flexibility for bending around the axis of the drain pipe 11, while retaining significant rigidity and strength in all other directions.

To enhance the seal, a gasket 29 of rubber or similar elastomeric material is adhered to the bottom of the base 26, to engage the drain pipe 11 as the base 26 wraps around its circumference. Hose clamps 30 or other suitable clamping means are utilized to secure the base 26 to the drain pipe 11 surface, compressing the gasket 26 and sealing the device against leakage from both within and without.

Figure 7:
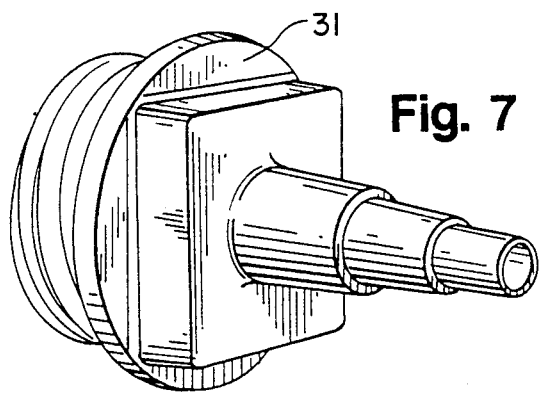
FIG. 7 is a perspective of an alternative embodiment of the invention adapted to screw into a clean-out opening or other drain pipe connection.

An alternative embodiment of the invention is shown in FIG. 7, in which the body 15 of the previous embodiment, including its one-way check valve, are incorporated into a screwed-in drain plug means 31, which is received by and threaded into a conventional Y-branch or T-branch fitting (not shown).

For this application, the drain pipe 11 must be severed and the branch fitting 32 inserted in a known manner. To achieve a reliable seal, the threads of the drain plug 31 are preferably coated with sealing compound or wrapped with sealing tape in a known manner.

I claim as my invention:

1. A drain fitting adapted to receive a condensate drain line having an inner diameter and to direct condensate flow into a drain opening in a water waste drain pipe, said fitting being characterized by
    a cylindrical body with an inlet end and having a plurality of stepped-down diameters, one of which corresponds to the inner diameter of the condensate drain line,
    said body having an inlet opening an outlet opening, and a check valve chamber aligned with said inlet and outlet openings,
    said check valve chamber having a valve seat and containing a valve element moveable into selective sealing engagement with the valve seat for preventing back flow from the drain pipe,
    capture means for capturing the check valve element within the chamber for one-way sealing engagement with the valve seat, and
    retaining means for securing the body to the drain pipe with the inlet opening positioned for communication with the drain pipe opening.

2. The fitting of claim 1 in which the cylindrical body is formed of thermoplastic material, and the capture means comprises at least two inwardly-extending retaining ridges made by deforming edges of the inlet opening with a tool under heat and pressure.

3. The fitting of claim 1 in which the cylindrical body is attached at its outlet end to a flexible base, said base having a curved planar surface adapted to conform to the surface of the water waste drain pipe, and said base being characterized by a plurality of outwardly-facing grooves aligned substantially parallel with the water waste drain pipe, whereby the base is enabled to wrap around the drain pipe in sealing relationship.

4. The fitting of claim 3 in which the cylindrical body is formed of thermoplastic material, and the capture means comprises at least two inwardly-extending retaining ridges made by deforming edges of the inlet opening with a tool under heat and pressure.

5. The fitting of claim 4 in which a gasket is attached to the planar surface at a point where the planar surface contacts the water waste drain pipe.

6. In combination,
    a water waste drain pipe having a central axis and comprising two co-axial segments connected by a branch fitting, said branch fitting having a branch opening extending to one side of the drain pipe axis,
    a drain plug means removably received within said branch opening and having a cylindrical drain fitting projecting outwardly from said branch fitting,
    said drain fitting having an inlet opening, an outlet opening, a check valve chamber aligned with said inlet and outlet openings, and a plurality of stepped-down outer diameters over arranged such that a condensate drain tube can be fitted over one of said diameter, said check valve chamber having a valve seat and containing a valve element moveable into one-way sealing engagement with the valve seat for preventing back flow from the drain pipe, and capture means for capturing the check valve element within the chamber.

7. The combination of claim 6 in which the cylindrical body is formed of thermoplastic material, and the capture means comprises at least two inwardly-extending retaining ridges made by deforming edges of the inlet opening with a tool under heat and pressure.

* * * * *